(12) United States Patent
Peled

(10) Patent No.: US 7,079,554 B2
(45) Date of Patent: Jul. 18, 2006

(54) SYSTEM AND METHOD FOR SYNCHRONIZING BETWEEN COMMUNICATION TERMINALS OF ASYNCHRONOUS PACKETS NETWORKS

(75) Inventor: Eran Peled, Kiryat Uno (IL)

(73) Assignee: Terasync, Ltd., Yahud (IL)

( * ) Notice: Subject to any disclaimer, the term of this patent is extended or adjusted under 35 U.S.C. 154(b) by 0 days.

(21) Appl. No.: 10/271,927

(22) Filed: Oct. 16, 2002

(65) Prior Publication Data

US 2004/0076187 A1    Apr. 22, 2004

(51) Int. Cl.
*H04J 3/06* (2006.01)
(52) U.S. Cl. ............... 370/514; 370/503; 370/516
(58) Field of Classification Search ........ 370/514, 370/503, 280, 314, 324, 350, 516
See application file for complete search history.

(56) References Cited

U.S. PATENT DOCUMENTS

| | | | |
|---|---|---|---|
| 6,333,940 B1 * | 12/2001 | Baydar et al. | 370/506 |
| 6,633,590 B1 * | 10/2003 | Garofalo et al. | 370/507 |
| 6,731,649 B1 * | 5/2004 | Silverman | 370/466 |
| 2002/0110157 A1 * | 8/2002 | Jorgenson et al. | 370/537 |
| 2003/0035444 A1 * | 2/2003 | Zwack | 370/503 |
| 2003/0039272 A1 * | 2/2003 | Dudziak et al. | 370/503 |
| 2003/0056136 A1 * | 3/2003 | Aweya et al. | 713/400 |
| 2004/0062278 A1 * | 4/2004 | Hadzic et al. | 370/503 |

* cited by examiner

*Primary Examiner*—Chirag Shah
(74) *Attorney, Agent, or Firm*—Kattten Muchin Rosenman LLP

(57) ABSTRACT

A new method for synchronizing transmissions of real time synchronous data packets over an asynchronous network between two terminal nodes is disclosed. The synchronization procedure is implemented within intermediating communication devices, which connect between the terminal nodes TDM equipment and the asynchronous network. Each communication device comprises local clocks, which are activated by a Stratum 2/3/3e/4/4e pulse generator. The local clocks synchronization is based on the transmission of a reference timestamp packet through an asynchronous network. Based on this timestamp references, an internal digital PLL is used for attenuating the jitter/wander in data transmission signal in accordance to Stratum 2/3/3e/4/4e accuracy standards. The DPLL data result is then processed to be used by the local clock of the receiving terminal.

14 Claims, 6 Drawing Sheets

The IPsync Environment

SYSTEM AND METHOD FOR SYNCHRONIZING BETWEEN COMMUNICATION TERMINALS OF ASYNCHRONOUS PACKETS NETWORKS

BACKGROUND OF THE INVENTION

1. The Scope of the Invention

This invention relates to the synchronization of real-time data streams over asynchronous packet networks, in particular to the synchronization of timing and data over Ethernet and IP optical networks.

2. Backround

Industry experts recognize that Internet growth has created an unprecedented demand for additional core network capacity. The scalable and distributed nature of the Internet continues to contribute to it's growth on all of the fronts, including users, hosts, links and existing and emerging applications.

Internet users have been connecting at higher link speeds, and usage duration continues to grow, creating an exponential increase in traffic volumes.

Today's Metropolitan Area Networks (MAN) are based on SONET optical rings. The SONET protocol, originally designed for carrying voice, can no longer accommodate the requirements of a world that is becoming data-centric. The most suitable transport paradigm for the new packet-based traffic, increasing at a furious pace, is the Ethernet.

Though computing network environments have evolved and transmission rates have increased exponentially, the Ethernet network architecture has remained dominant. While a communication rate of 10 Mb/s was once considered as state-of-the-art technology, today an Ethernet local Area Network (LAN) may transmit at speeds of up to 10 Gbps, 20 Gbps and even more.

This is due to the development of optical fiber technologies that have enabled the transmission of digital data streams at rate of up to 10 gigabit/sec and more. This channel-to-channel technology involves the coupling of various computer systems together with optical fiber or with a fiber channel compatible electrically conductive (copper) cable, allowing data transmissions between machines separated by relatively great distances.

The existing switches and routers provide neither the performance nor the port density required to efficiently create a real-time simultaneous network with raw optical data.

One of the main characteristics of TDM (Time Division Multiplexing) networks is time synchronization (a natural requirement of it's time slots multiplexing method). In the Public Switched Telephone Network (PSTN) or in SONET/SDH networks, a clock master provides a primary time reference for synchronizing all of the network nodes (the time discipline). This master clock has an extremely long term accuracy of one part in $10^{-11}$. This reference time, the accuracy of which is called stratum 1, provides the reference clock to secondary network nodes with stratum 2 accuracy, and these in turn provide a time reference to stratum 3E and then stratum 3 nodes. This hierarchy of time synchronization is essential for the proper functioning of the TDM network as a whole.

A 10 gigabit optical network lacks the ability of transferring real-time synchronous data, since it is all based on a best effort from each of the routers within the Ethernet cloud and since the nature of pure packetized networks cannot ensure a stable or expected delay. This current situation does not allow good quality telephone voice transmissions to be created.

One of the main drawbacks that prevent optical networks from providing real-time data transmissions is the lack of synchronization between clock frequencies from the receiving and from the transmitting terminals connected to the optical network. In TDM applications, the transmitter and the receiver must share a common time base or at least be synchronized with one another in a Master/Slave chain, otherwise there cannot be a TDM connection.

This lack of synchronization results from several factors. The data Packets transmission in an asynchronous network suffers from random delays that are known as jitter and wander. The term "jitter" is used to describe short term signal variations, such as pulse position modulation frequencies that exceed frequencies of 10 Hz. The term "wander" is used to describe longer term variations of significant digital signal properties (e.g., zero level crossings) from their ideal positions in time and is applied to pulse position modulation frequencies below 10 Hz.

"Jitter" is typically attributed to additive Gaussian noise, whereas wander is typically attributed to slower varying environmental conditions.

Prior art methods and systems overcome the mentioned deficiencies by using a methodology called phase locked loop (PLL) (e.g. U.S. Pat. No. 6,246,738).

Another approach to overcoming this randomness when emulating TDM over an IP network is by using a buffer (FIFO) to smooth out all of the incoming data. This approach assumes that the proper time references are available. For the most part, however, the original time reference information is no longer available. The average time of emptying the buffer must be the same as the average rate of filling it up, otherwise we would be loosing data.

Another factor is known as packets slipping or the loss of data packets. This problem is more acute when relating to high rate data transfer networks such as an optical 10 gigabits network. Data packets arriving out of order result in substantial differences between the clock frequencies of the receiving device and transmitting device. In this case, trying to restore a clock frequency according to the incoming packet rate, by using it as a reference for the original transmission (+Jitter and −Wander caused by the network), would produce a frequency that is inaccurate, a result of the lost packets. Even the loss of only one packet out of a million packets creates a frequency error of 1 PPM ($1\times10^{-6}$), while the bit rate synchronization must satisfy $1\times10^{-12}$ accuracy standards.

Prior art solutions, as proposed in U.S. Pat. No. 5,790,538, mainly address the problems of the actual loss of the data packets and methods for recovering them.

It was then suggested to provide time standards such as atomic clocks or GPS receivers to each edge terminal, thus relieving the IP network from the need to send and receive synchronization information. This suggestion does not provide any solution at all and would be a costly attempt. The incoming data has a certain momentary clock rate (according to the actual wander), which is influenced by routing interferences, temperature effects, network delays etc. If we try to extract that data by using an external clock, such as a GPS clock (even as accurate as an atomic standard), the data still arrives at a different average frequency. The slips and inaccuracy problems and loss of data remain the same. The local clock should represent the changing average of the incoming data at the time. This type of clock is called a "Breathing Networking Clock" that is capable of managing with the flexibility of the network, yet having a time discipline set to one central location, usually to the core switch that has the most accurate clock, and this accurate clock is also locked onto a better clock upstream.

There is also another solution based on retrieving the clock data from the nearest PSTN using existing linkages to the PBX via SONET. Such a solution requires the use of two competing networks and is based on the assumption that the PSTN is the same on both sides of the network. This is a very dangerous assumption, especially in a wide area IP network. But even if this assumption is right, the cost would be substantially high since the customer would have to pay for the use of two (and some times even four) different suppliers and networks.

BROADCOM HOMENETWORKING, INC introduces another solution in their international patent application, number WO 01/43325 A1. The BROADCOM application incorporates a synchronizing protocol for allowing voice phone calls over IP networks, which is specially adapted for the Home Phone line network alliance (HPNA). This synchronization solution between two end terminals is based on timestamp messages and network access expected jitter. Such a protocol methodology does not provide a complete solution for attenuating asynchronous network jitter/wander of up to a 250 microsecond amplitude. Thus, this solution cannot provide synchronization of real time data transmissions, and in particular the BROADCOM synchronization method does not comply with the requirements of the stratum 2/3/3e/4/4e environment, such as low output jitter (even in a case of 250 microsecond input jitter), hitless switch over between references, etc.

It is therefore a primary object of this invention to avoid the limitations of the prior art and provide real-time synchronous data transmission over asynchronous networks complying with the standards of Stratum 3/3e environment.

SUMMARY OF THE INVENTION

According to the present invention, a method is suggested for synchronizing the transmission of real time synchronous data packets over an asynchronous network between at least two terminal nodes using intermediating communication devices, which connect between the terminal node's TDM equipment and the asynchronous network wherein, said communication devices are synchronizing internal local clocks, which are activated by Stratum 2/3/3e/4/4e pulse generator, by utilizing transmission of reference timestamp packets through asynchronous network, wherein an internal digital PLL is used for attenuating jitter/wander in data transmission signal, in accordance with stratum 2/3/3e/4/4e accuracy standards.

BRIEF DESCRIPTION OF THE DRAWINGS

These and further features and advantages of the invention will become more clearly understood in light of the ensuing description of a preferred embodiment thereof, given by way of example only, with reference to the accompanying drawings, wherein—

DETAILED DESCRIPTION OF THE PREFERRED EMBODIMENTS

The present invention provides a new methodology and implementation for enabling real-time synchronous data transmission in asynchronous networks. Today, Metropolitan Area Networks (MAN) enable the transmission of asynchronous data packets between any two terminals connected to the network. The data packets transmission is unorganized. Data packets arriving at the receiver terminal are not necessarily in the same order transmitted in. Furthermore, these packets may be subjected to time delays, which are random in length, herein referred to as "jitter". Random time delays are inherent in networks that transmit data in data subsets. Each data packet may arrive at the receiver with a total transmission time, which may vary from packet to packet. Depending upon the network path and network congestion conditions, transmission time delays may be highly different between packets.

The main concept of the present invention is to provide a new communication module integrated within the intermediating device that is connected to the asynchronous networks edge nodes. These edge nodes are CTE equipment (Connected Telecommunication Equipment) or known by their nickname as "Pizza Boxes". This equipment is designated for intermediating between the asynchronous network and the TDM communication equipment, ensuring organized data packet transmission and eliminating the networks interferences and effects of (changing) delays distortion.

For achieving synchronization, each intermediating communication device is equipped with a local clock for generating timestamp data packets. The timestamp packets are broadcasted at periodic time intervals between each pair of intermediating devices through the asynchronous network. When receiving new data packets, an intermediating device synchronizes it's local clock according to the timestamp received from the transmitting terminal device. In the case in which the intermediating device has to synchronize between more than two terminals at the same time, the system would require additional local clocks, one clock for each parallel session. An example for this type of implementation would be for a gateway server, which serves local networks and has to synchronize multiple terminal transmission sessions, hence for each new initiated transmission session, a different local clock is required.

This synchronization methodology further includes redundancy mechanism that supports simultaneous analyzing of two synchronization sources and enables hitless-switching between two references (according to the relevant standard; GR-1244, GR-253, etc).

Figure 1:
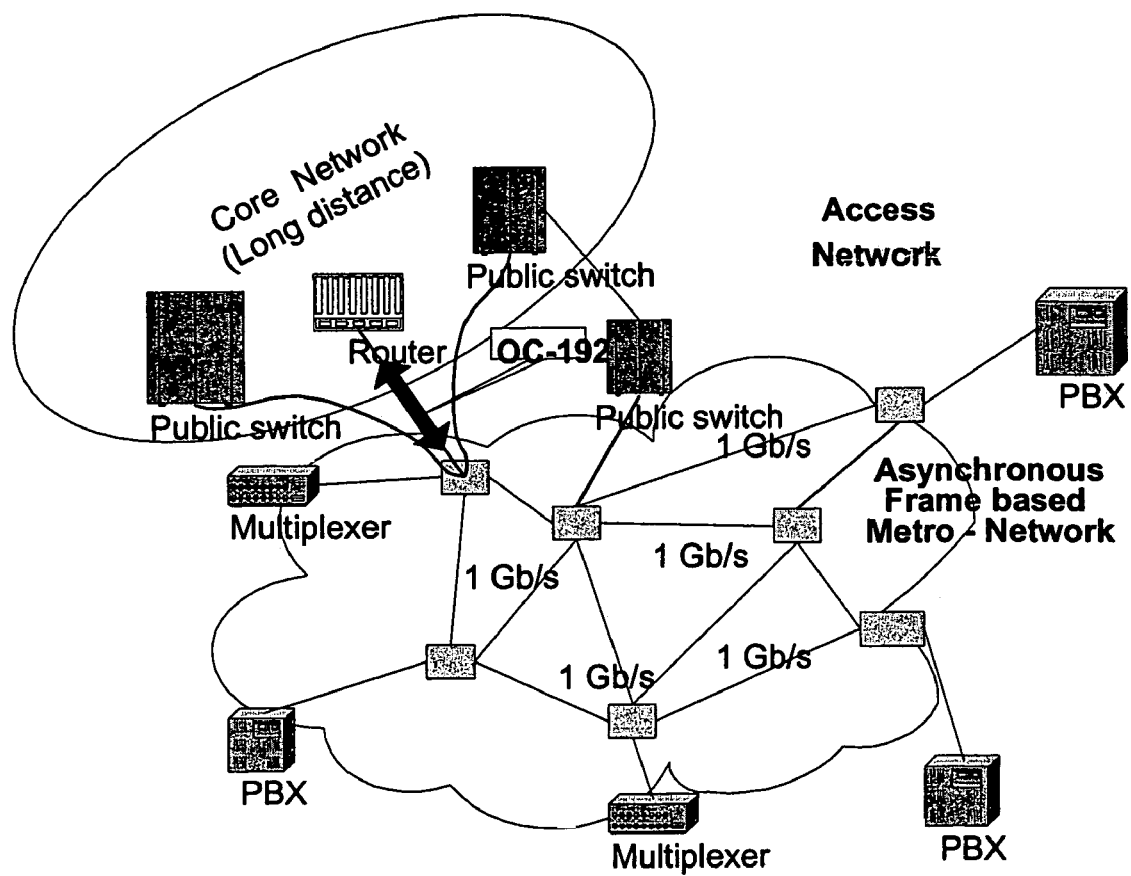
FIG. 1 is a representation of the of prior art network environment.

FIG. 1 illustrates the environment according to the prior art, in which the present invention is to be practiced. The metro-network connects between local PBX devices and long distance core networks through optical wiring, enabling data transmissions at 10 gigbit Gbps and more.

Figure 2:
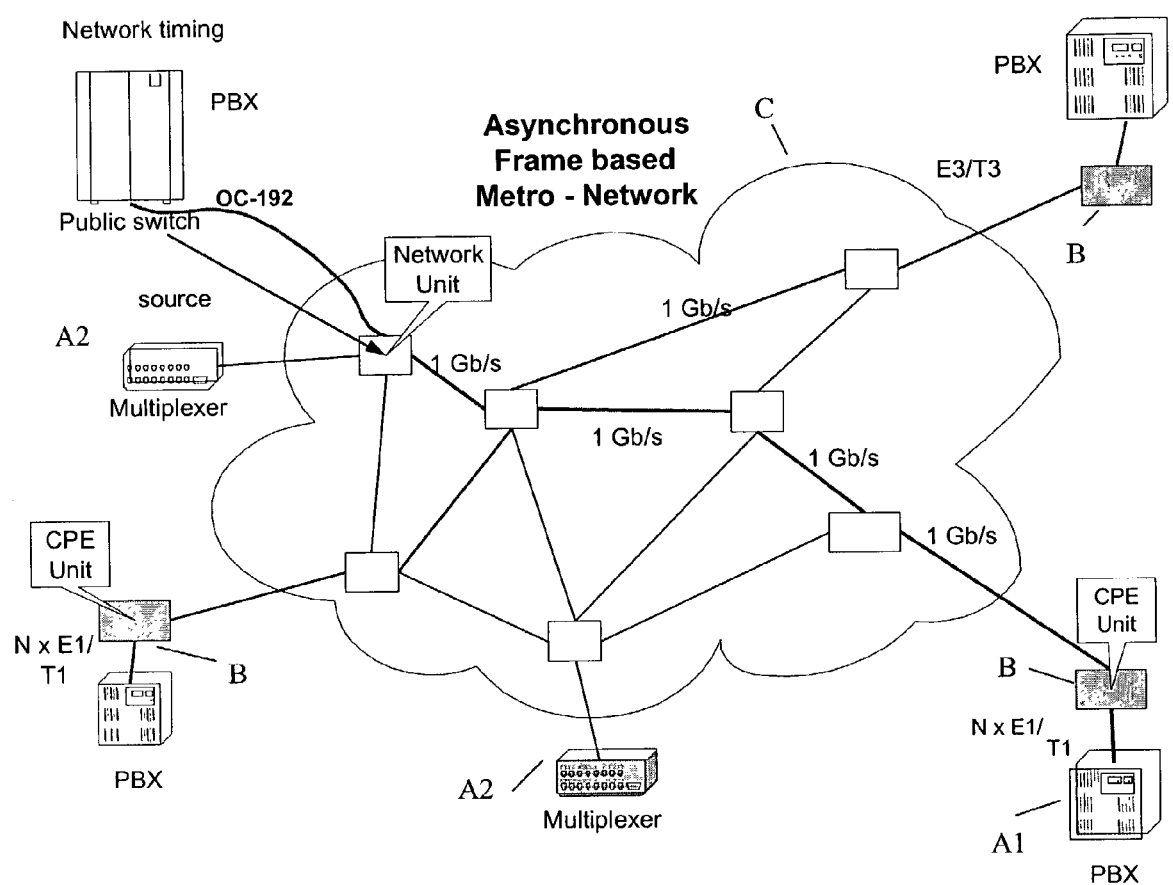
FIG. 2 is an illustration of environment in which the present is practiced.

FIG. 2 depicts an example of applying the present invention system and method in a telecommunications network. Edge network nodes such as a PBX (Private Branch Exchange) A1, or a multiplexer A2 or Internet servers A3 are interconnected through a metropolitan asynchronous network C. The CTE devices B are intermediating devices for enabling the synchronous data transmission between the network edge nodes. (A1, A2, A3).

Figure 3:
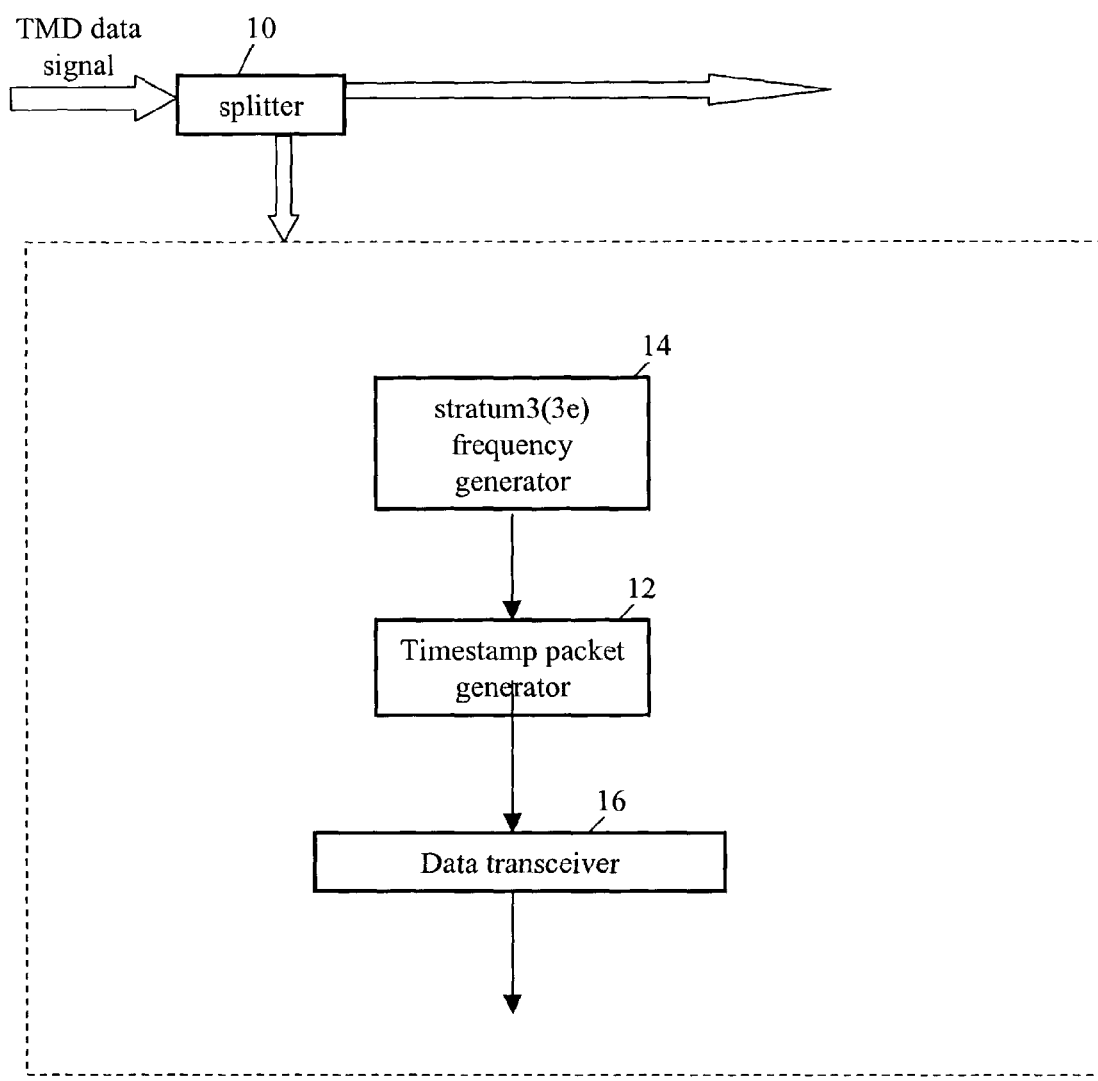
FIG. 3 is a block diagram illustrating the transmitter synchronizing module according to the present invention.

FIG. 3 illustrates a block diagram of the transmitting module, which is implemented within the intermediating device B. Splitter unit 10 is associated with the device input interface for routing the input of a TDM data signal through the device B, without interfering with the streaming dataflow of the network. Stratum 2/3/3e/4/4e frequency generator 14 feeds the unit 12 with an accurate clock rate for generating a timestamp. The data transceiver, unit 16, receives the timestamp packets and prepares them for broadcasting to the asynchronous network C. The timestamp data packets are broadcasted at periodic intervals to all active terminals in the network.

Figure 4:
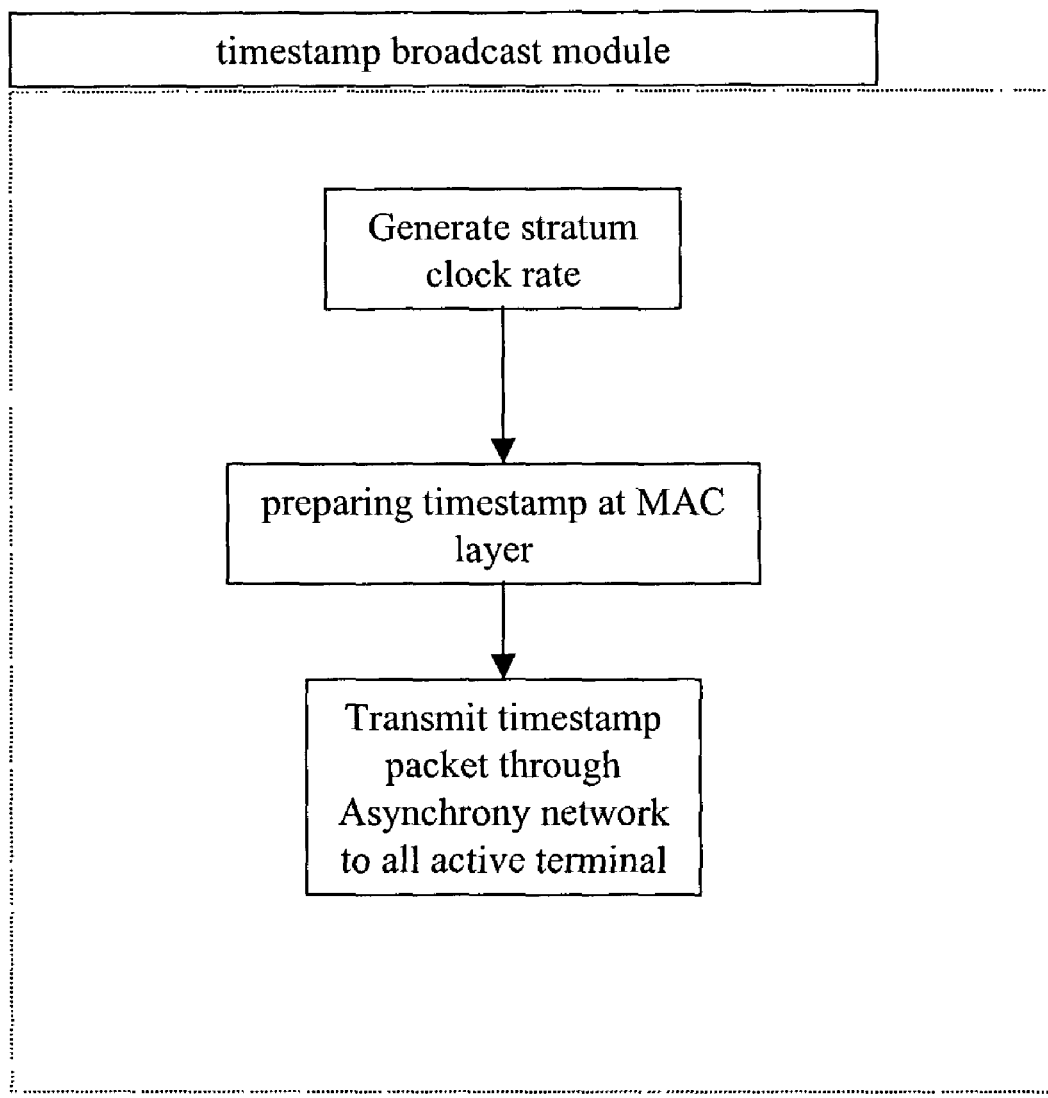
FIG. 4 is a flowchart illustrating the process of timestamp transmission.

The flow of transmission is illustrated in FIG. 4. Continuously, the frequency generator creates clock pulses at a constant rate in accordance with the stratum 2/3/3e/4/4e standards. This clock is used as a reference for the timestamp generator module.

Figure 5:
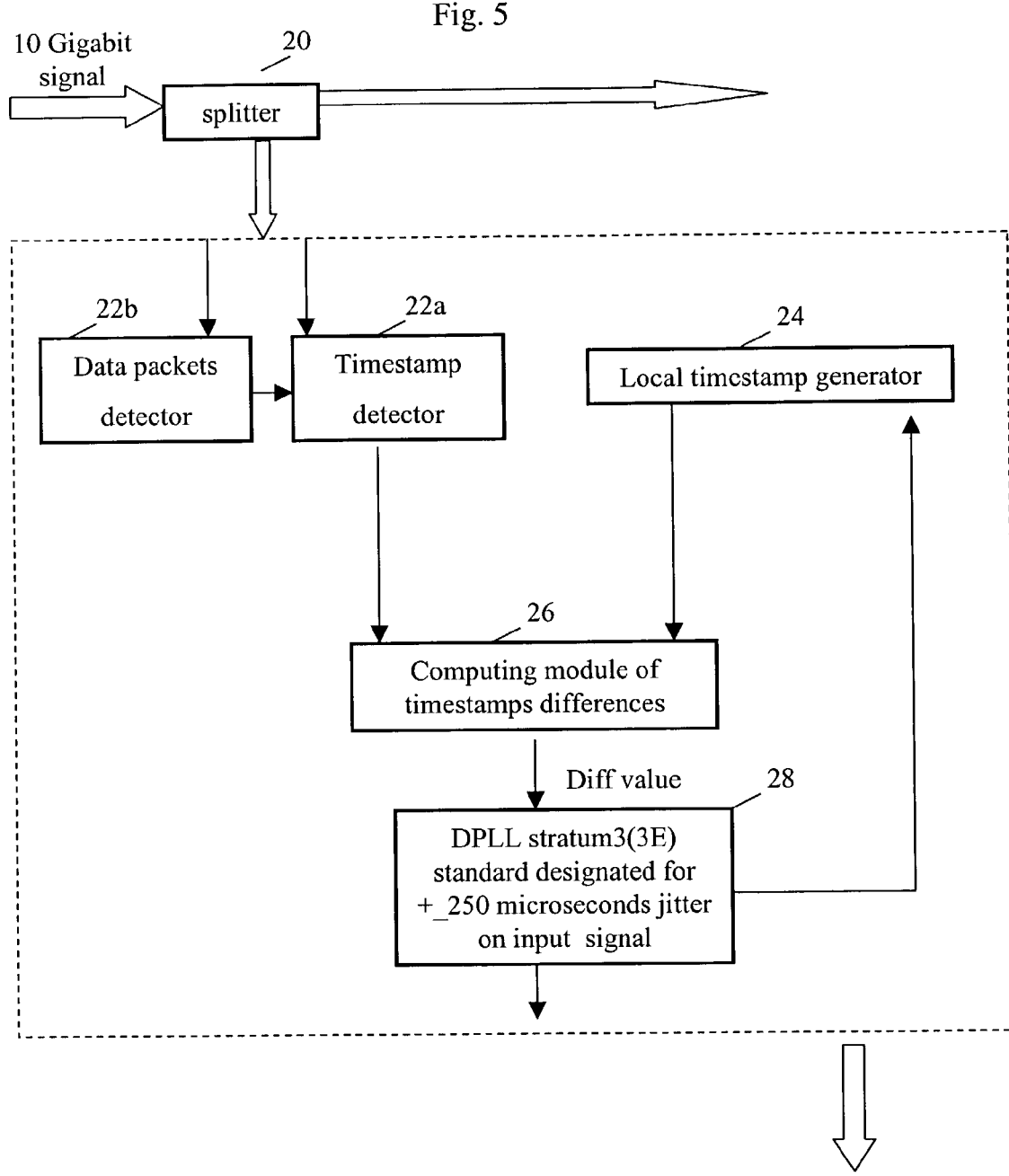
FIG. 5 is a block diagram illustrating the receiver/synchronizing module according to the present invention.
Figure 6:
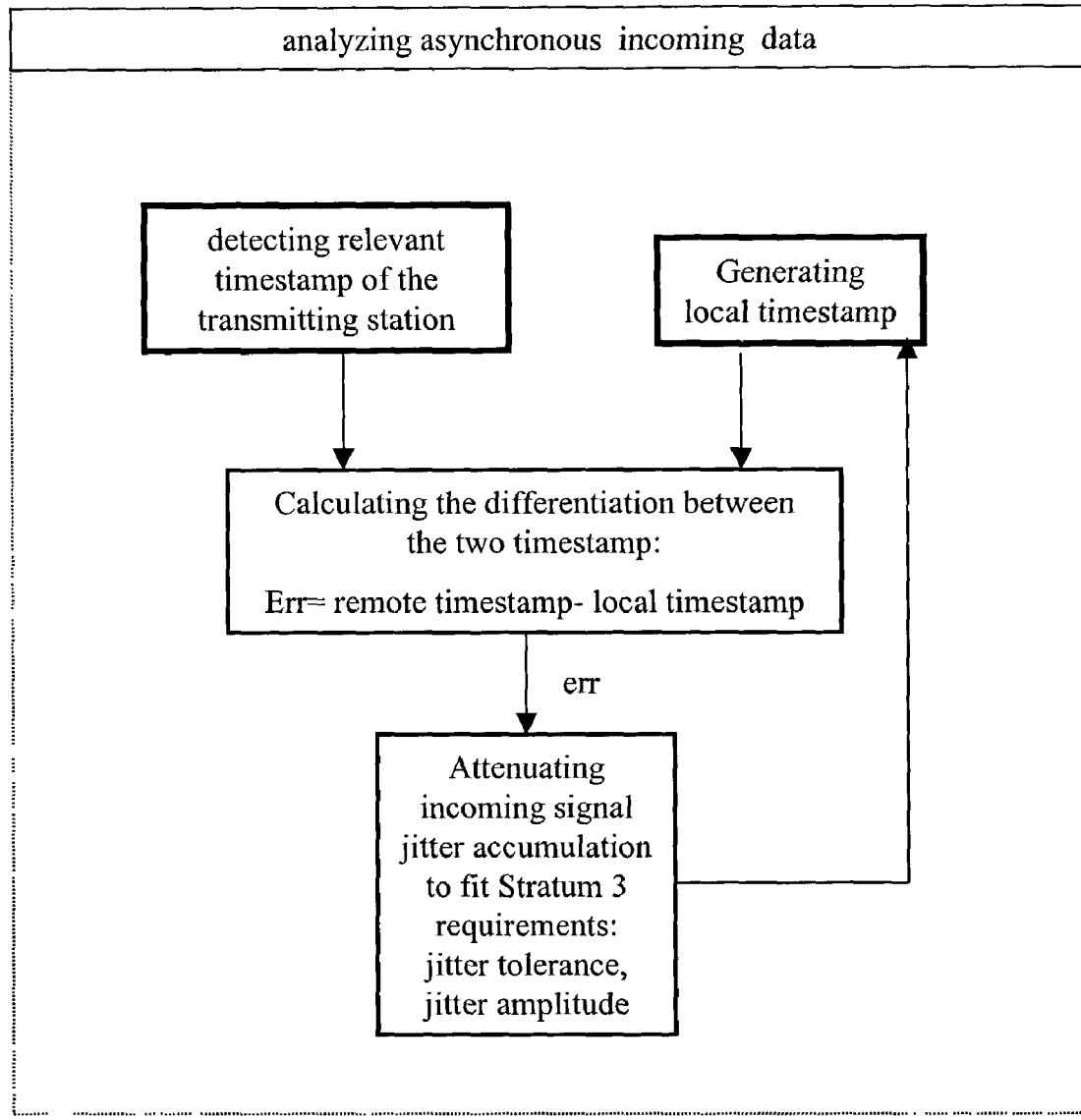
FIG. 6 is a flow-chart illustrating the process of synchronizing according to the timestamp mechanism.

FIG. 5 depicts the receiver module as implemented in device B. Splitter 20, which is associated with the input interface of the receiving section, routs the incoming data signals from the network C to device B receiver unit, without interfering with the data flow directed to the edge nodes devices (A1, A2, or A3). The timestamp detector 22 and data packets detectors are filtering the incoming packets for identifying the relevant timestamp of the respective transmitting station from which data packets are received. The local timestamp is generated in the local timestamp generator 24, which its reference clock is the DPLL's output clock that will be described in the following section. Both the timestamp's resolution and the packets transmission rate are defined to fulfill the DPLL demands in order to comply with the relevant Stratum standards.

The difference between the two timestamps (the local and remote) is being calculated at unit 26 (calculation of the real round trip delay is also achieved at this procedure), and its output is fed into the DPLL (unit 28). The DPLL processes the incoming signal of the received data/timestamp packets for attenuating jitter accumulation, according to output data of unit 26, to fit network synchronization requirements. The expected jitter per network node in the values of ±250 microseconds (as long as MPLS is not yet activated) to a value of ±1 nanoseconds.

The DPLL is programmed to reduce jitter and wander interferences in accordance to the Stratum 2/3/3e/4/4e accuracy standards.

The output results of the DPLL processing is returned to the local time stamp generator 24 for adjusting the local time pulsing in accordance with the respective remote timestamp generator.

The synchronization solution as proposed by the present invention does not require any changes at the user's TDM communication equipment or in the metropolitan network components. The solution can also be used in Ethernet Telemetric.

While the above description contains many specificities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A method for synchronizing transmission of real time synchronous data packets over an asynchronous network between at least two terminal nodes using an intermediating communication device which connects between the terminal nodes TDM equipment and the asynchronous network, wherein communication devices comprise internal local clocks which are each activated by a stratum pulse generator, wherein local clocks are synchronized by utilizing transmission or reference timestamp packets through the asynchronous network and using an internal digital phase locked loop (DPLL) for attenuating jitter and wander in a data transmission signal in accordance to stratum accuracy standards, wherein the synchronization procedure of the local clocks comprises the steps of:

a. transmitting a timestamp, at a low layer through the asynchronous network;

b. receiving incoming data packets from the asynchronous network at the receiver terminal node;

c. identifying a timestamp packet of a transmitting station among the incoming data packets, and extracting a remote timestamp of the timestamp packet;

d. calculating a difference between the remote timestamp, which originated in the network, and a local timestamp, and using the calculated difference as an input to the DPLL;

e. attenuating jitter and wander in data transmission signal by the DPLL, in accordance to the stratum accuracy standards; and f. outputting a DPLL output result as a new reference for generating a next timestamp.

2. The method according to claim 1, wherein the local timestamps are broadcast at periodic intervals to all active terminals in the network from each terminal node to all active terminal nodes connected to the asynchronous network.

3. The method according to claim 2, wherein the timestamps are transmitted within regular data packets.

4. The method according to claim 1, wherein the asynchronous network is an optical network.

5. The method according to claim 1, wherein jitter and wander are reduced to meet the various stratum standards.

6. A receiver/transceiver system that is implemented within intermediating communication devices which connect between TDM communications equipment and an asynchronous optical network for synchronizing transmissions of real time synchronous data packets over the asynchronous network between at least two user terminal nodes, said system comprising of:

a. at least one stratum clock rate generator for providing classified clock pulse to each TDM switch terminal node;

b. a data transceiver unit for generating the timestamp packets according to stratum clock pulse and transmitting thereof through the asynchronous network;

c. a receiver unit for receiving incoming data packets from the asynchronous network;

d. a data packet detector for identifying the relevant timestamp of the respective transmitting station;

e. a computing module for calculating the time difference between the local timestamp and the remote timestamp; and f. a digital phase locked loop (DPLL) unit for attenuating the jitter and wander of the incoming signals, based on the calculator results for providing output signals in accordance to stratum standards, wherein the output of the DPLL provides the reference for the generation of the next local timestamp.

7. The system of claim 6 wherein the stratum standards include stratum 2, 3, 3e, 4, and 4e.

8. The system of claim 6 further comprising a redundancy mechanism that supports simultaneous analyzing of two synchronization sources and enables hitless-switching between two references.

9. The system according to claim 6, wherein the timestamps are broadcast at periodic intervals to all active terminals in the network from each terminal node to all active terminal nodes connected to the asynchronous network.

10. The system according to claim 6, wherein the timestamps are transmitted within regular data packets.

11. The system according to claim 6 wherein the asynchronous network is an optical network.

12. The system according to claim 6 wherein the jitter is reduced below the value of +250 microseconds to a value of +/−1 nanoseconds, despite the large amplitude jitter/wander at the input.

13. A module for synchronizing transmission of real time synchronous data packets over an asynchronous network between at least two terminal nodes, said module for synchronizing transmission implemented within intermediating communication devices connecting between TDM equipment and an asynchronous optical network, wherein each communication device comprises:
   a. a data packets detector for receiving incoming data packets from the asynchronous network at a receiver terminal node;
   b. a timestamp detector for identifying a timestamp packet of a transmitting station among the incoming data packets, and extracting a remote timestamp of the timestamp packet;
   c. a computing module for calculating a difference between the remote timestamp, which originated in the network, and a local timestamp;
   d. an internal digital phase locked loop (DPLL) associated with a stratum pulse generator, attenuates jitter and wander interferences in accordance with stratum accuracy standards; and e. a local timestamp generator, which receives an output from the DPLL for generating a next local timestamp.

14. The method of claim 1, wherein the stratum standards include stratum 2, 3, 3e, 4 and 4e.

* * * * *